United States Patent [19]
Ruda et al.

[11] 3,987,966
[45] Oct. 26, 1976

[54] CENTRIFUGAL CHAFF DISPENSER

[75] Inventors: Ernest V. Ruda, East Amherst; John E. Blickenstaff, Tonawanda; Clayton J. Schneider, Jr., East Aurora, all of N.Y.

[73] Assignee: Calspan Corporation, Buffalo, N.Y.

[22] Filed: Nov. 17, 1975

[21] Appl. No.: 632,421

[52] U.S. Cl. .............................. 239/687; 222/410; 239/171; 343/18 E
[51] Int. Cl.² ...................................... A01C 17/00
[58] Field of Search ............ 222/410, 193; 239/216, 239/171, 687, 689; 343/18 B, 18 E

[56] References Cited
UNITED STATES PATENTS 3,497,139    2/1970    Pottgiesser et al. ............. 222/410 X

FOREIGN PATENTS OR APPLICATIONS 290,666    8/1929    United Kingdom ................. 239/171

*Primary Examiner*—Allen N. Knowles
*Assistant Examiner*—Hadd S. Lane
*Attorney, Agent, or Firm*—David J. Zobkiw

[57] ABSTRACT

Bundles of chaff fibers are fed into a rotating preacceleration chamber having a diverging outlet. The chaff fibers are rotated with the preacceleration chamber and are forced radially outward by centrifugal force. A feed mechanism forces the rotating chaff fibers toward the diverging outlet from which they are propelled outwardly at a high velocity and at an angle almost orthogonal to the rotational axis of the chaff dispenser.

9 Claims, 8 Drawing Figures

CENTRIFUGAL CHAFF DISPENSER

Among the various electronic counter measures employed to confuse radar detection systems are devices for dispensing metalized fibers which are commonly called radar chaff. Because there are several different radar frequency bands, the length and number of the chaff fibers required to defeat a radar detection system will be different for each radar band. Rather than using chaff bundles of various diameters, currently used chaff dispensers provide a plurality of chaff bundles of uniform diameter with the length of the fibers and the number of bundles being dictated by the band of the radar system to be encountered.

Chaff dispensers in current use provide an inefficient dispersal of the radar chaff especially in the orthogonal plane with respect to the aircraft flight vector. Conventionally, the chaff fibers are introduced into the air stream where the fibers tend to agglomerate causing clumping of the fibers which results in a radar return which is 5 – 10% of that which would result if all of the chaff fibers were free dipoles.

Two major types of chaff dispensers are currently employed. In the first type, chaff fibers are packaged in cardboard boxes which are partially opened before leaving the aircraft; opening is completed in the air turbulence behind the aircraft. No other organized energy is imparted to the contents to assure separation. In the second type, chaff is fired from cartridges which leave the aircraft en masse and have no organized energy source to separate them from each other except accidental separation by wind turbulence. Both systems fail to separate each chaff fiber from every other fiber by at least its own length so as to maximize its efficiency.

It is an object of this invention to provide a chaff dispenser which achieves more rapid and efficient chaff fiber separation.

It is a further object of this invention to provide a method for deliberately separating chaff fibers as they are dispensed.

It is a still further object of this invention to provide a chaff dispenser which is capable of dispensing chaff fiber bundles of various lengths and various numbers of bundles without requiring excess fibers.

It is an additional object of this invention to provide a self-contained chaff dispenser which may be located in a pod for mounting on an aircraft or missile. These objects, and others as will become apparent hereinafter, are accomplished by the present invention.

According to the present invention, a centrifugal chaff dispenser is made up of a high speed rotating cylindrical or tapered preacceleration chamber, a ram or other feed mechanism, and a flared acceleration chamber. The chaff fibers are injected into the preacceleration chamber such that the fibers are parallel to the major axis of the preacceleration chamber which transitions into the much larger diameter flared section. As the bundle(s) of chaff fibers are pushed into the cylindrical section as by a feed plunger, by compressed air or by the centrifugal force developed when the acceleration chamber is tapered, the outer most fibers are accelerated in turn to increasingly higher rotational velocities. This process continues until the fibers reach the outer periphery of the rotating flared section and are propelled outwardly at a high velocity and at an angle almost orthogonal to the rotational axis of the device.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENTS

Figure 1:
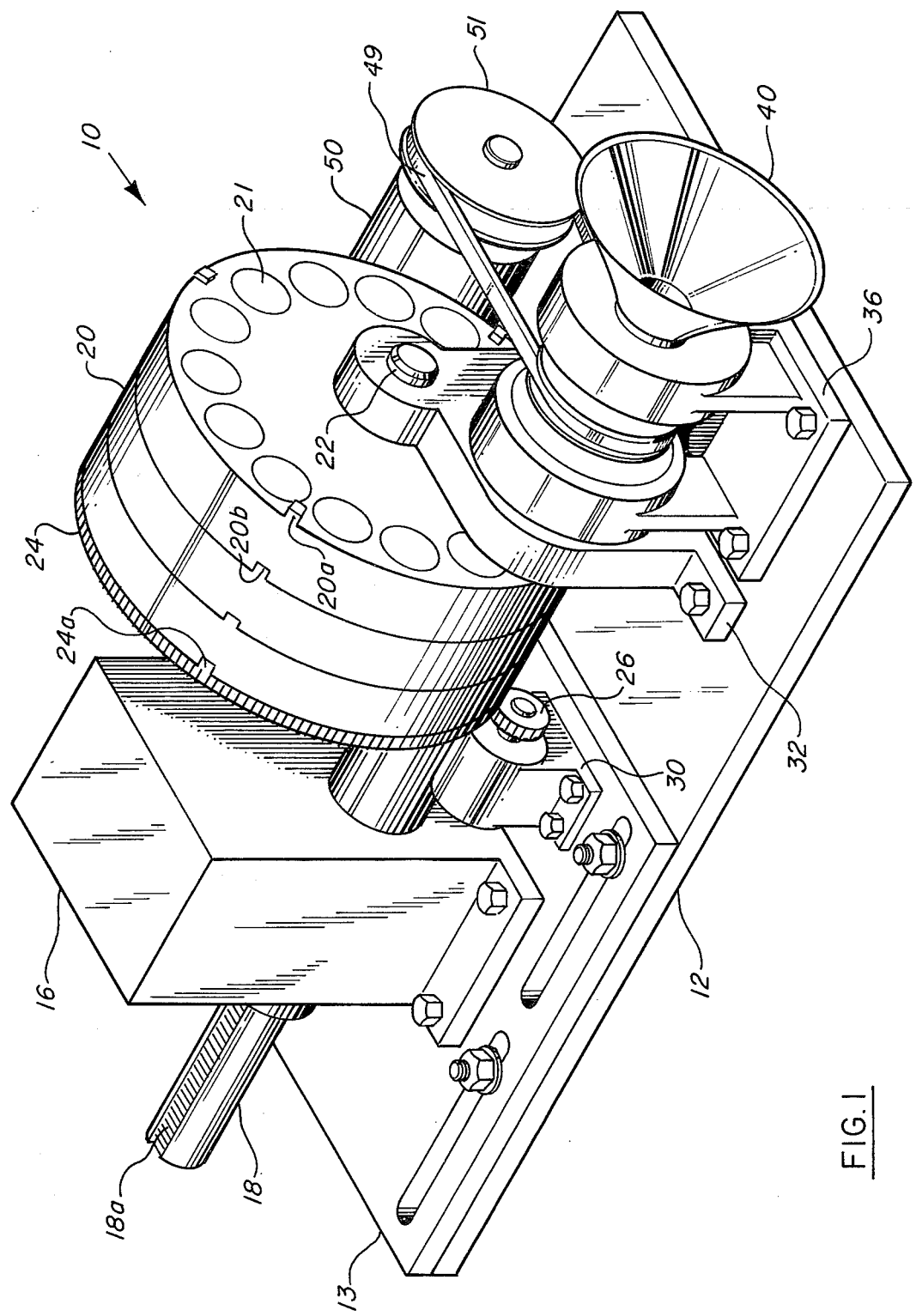
FIG. 1 is an isometric view of a centrifugal chaff dispenser.
Figure 2:
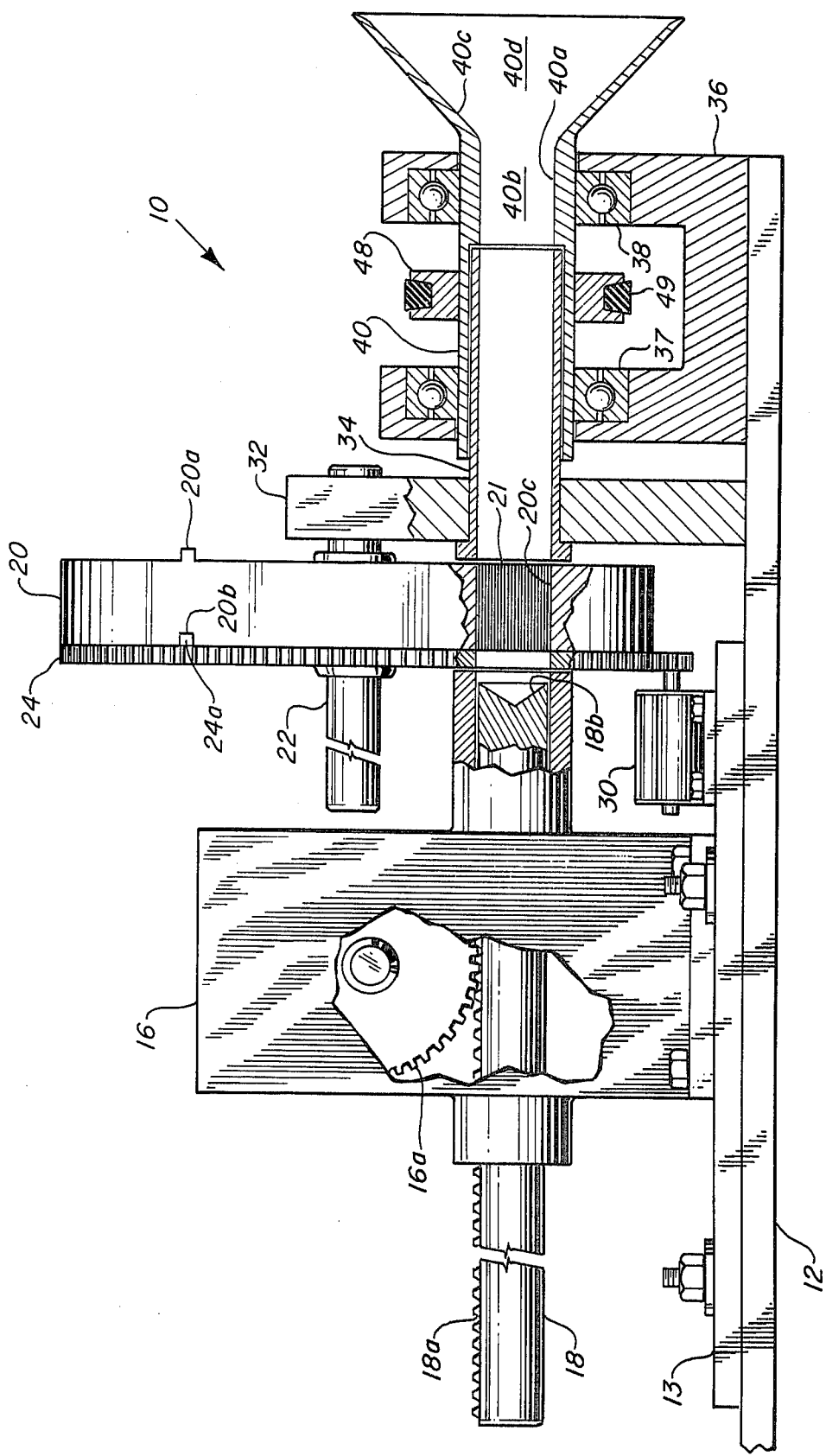
FIG. 2 is a partially sectioned view of the centrifugal chaff dispenser of FIG. 1.

In FIGS. 1 and 2, the numeral 10 generally designates a centrifugal chaff dispenser. The centrifugal chaff dispenser 10 is identical in FIGS. 1 and 2 except that the number of preloaded chaff cylinders 20 has been reduced in FIG. 2 to facilitate illustration and to demonstrate the adjustable features of the device. In actual usage, the centrifugal chaff dispenser 10 will generally be located in a self-contained pod (not illustrated) for attachment to an aircraft or missile. The centrifugal chaff dispenser 10 is mounted on base 12 which could be attached to or form a part of the pod. Gear box and motor 16 and indexing motor 30 are fixedly mounted on mounting plate 13 which is provided with a plurality of slots for adjustably mounting plate 13 on base 12. Gear box and motor 16 reciprocably drives feed plunger 18 through the coaction of rack 18a and pinion 16a. Limit switches (not shown) or other conventional structure may be provided to cause the feed plunger 18 to be reversed at the end of each stroke. One, or more pre-loaded chaff cylinders 20 together with gear 24 are aligned on shaft 22 by means of one or more mating tabs 20a and 24a, respectively, and recesses 20b which permit the gear 24 and chaff cylinders 20 to be rotated as a unit by indexing motor 30 through gear 26. Alternatively, the gear 24 and chaff cylinders 20 may be bolted together or otherwise secured as a unit. The number and size of the pre-loaded chaff cylinders 20 will depend upon the radar system(s) to be encountered. Alternatively, gear box and motor 16 may be fixedly mounted at a position which will permit the interposition of the desired number and lengths of preloaded chaff cylinders 20.

As is best shown in FIG. 2, mount 32 supports shaft 22 as well as stationary tube 34 which is coaxial with feed plunger 18, one of the bores 20c in pre-loaded chaff cylinder 20 and the chaff bundle 21 therein. Stationary tube 34 extends into and is coaxial with rotatable member 40 which is externally supported in double shaft hanger 36 by high speed bearings 37 and 38. Rotatable member 40 has a cylindrical portion 40a defining preacceleration chamber 40b, and a flared portion 40c defining centrifugal acceleration chamber 40d which is also the outlet. If necessary, or desired, high speed bearings may be mounted on stationary tube 34 for internally supporting rotatable member 40. Drive pulley 48 is secured to rotatable member 40 and is connected to the pulley 51 of the motor 50 via belt 49.

Figure 3:
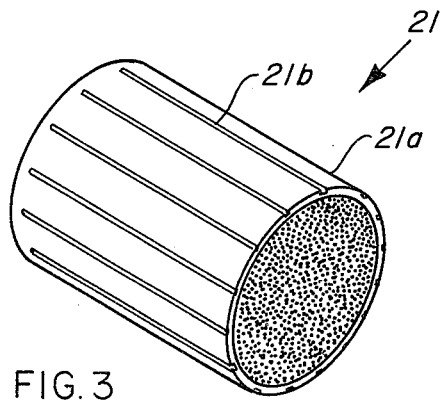
FIG. 3 is an isometric view of a chaff bundle.
Figure 4:
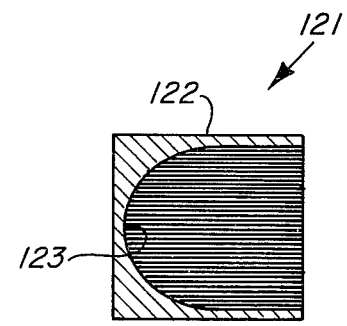
FIG. 4 is a sectional view of a modified chaff bundle.

As shown in FIG. 3, the chaff bundles 21 which are used in centrifugal chaff dispenser 10 are generally cylindrically shaped packages of parallel oriented metalized fibers. The chaff bundles are generally provided with a suitable wrapping 21a, such as paper or plastic, which may be provided with weakened areas 21b and which bursts or disintegrates under the centrifugal force produced by chaff dispenser 10. Alternatively, the wrapping may be removed prior to the introduction of the chaff bundle into the preacceleration chamber. The removing of the wrapping may be done automatically by a feeding mechanism or may be done manually as part of the loading operation. A modified chaff bundle 121 is illustrated in FIG. 4 and differs from conventional chaff bundles in that it contains chaff fibers of more than one length. The casing or wrapping 122 has an internal surface 123 whose contours are determined such that the chaff fiber length distribution will be correct for the radar systems to be encountered. Obviously, surface 123 will be different for each combination of radar systems.

OPERATION

Power for the centrifugal chaff dispenser 10 can be supplied by a ram air turbine which is incorporated into the pod, by the onboard electrical system of the aircraft or by any other suitable power source. Rotatable member 40 will be rotated at a rate determined by the speed of the aircraft and may be in the 7,000 to 8,000 rpm, or lower, range for relatively slow flying aircraft to the 30,000 to 40,000 rpm, or higher, range for high performance aircraft. Feed plunger 18, one bore 20c in each of the chaff cylinders 20, stationary tube 34 and rotatable member 40 will be in a coaxial relationship. An actuation signal is supplied by the pilot of the aircraft, or otherwise, to the gear box and motor 16 causing pinion 16a to rotate thereby moving rack 18a and driving feed plunger 18 toward pre-loaded chaff cylinder 20. The recessed head 18b of feed plunger 18 contacts chaff bundle 21 and pushes it and any chaff bundles ahead of it, where more than one pre-loaded cylinder 20 is used, through stationary tube 34 and into rotatable member 40. In the embodiment illustrated in FIG. 2 the chaff fibers must be advanced until they are at least partially extending into centrifugal acceleration chamber 40d before feed plunger 18 contacts a limiting switch (not shown) to cause reversal of feed plunger 18. Because only one pre-loaded chaff cylinder 20 is used, the recessed head 18b of feed plunger will extend past rotatable member 40 in its extreme position since the feed plunger stroke must be long enough to dispense several chaff bundles. Feed plunger 18 will be withdrawn from rotatable member 40, stationary member 34, preloaded chaff cylinder 20 and gear 24 before contacting a second limiting switch (not shown) thereby shutting off gear box and motor 16 and activating indexing motor 30 which drives 24 and thereby pre-loaded chaff cylinders 20 until the next bore 20c of each of the chaff cylinders is in coaxial alignment with feed plunger 18, stationary tube 34 and rotatable member 40. Centrifugal chaff dispenser 10 will then be ready to dispense another charge of chaff.

Figure 8:
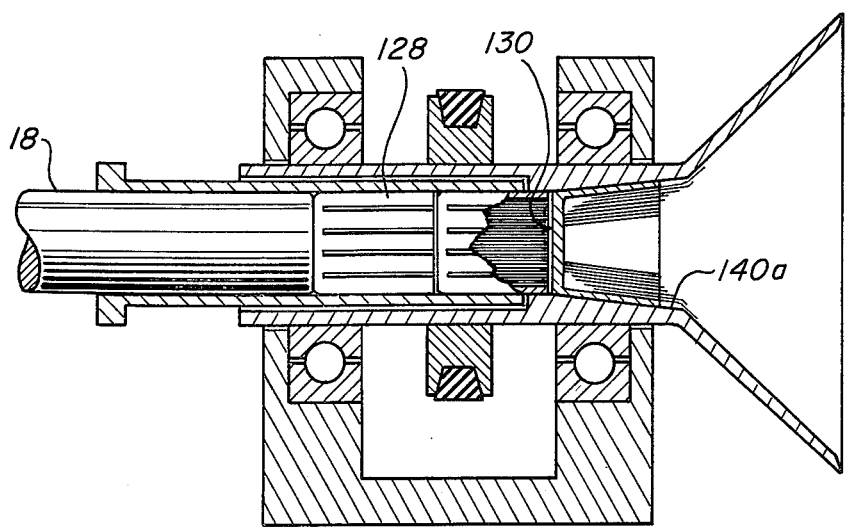
FIG. 8 is a sectional view of a modified preacceleration chamber.
Figure 5:
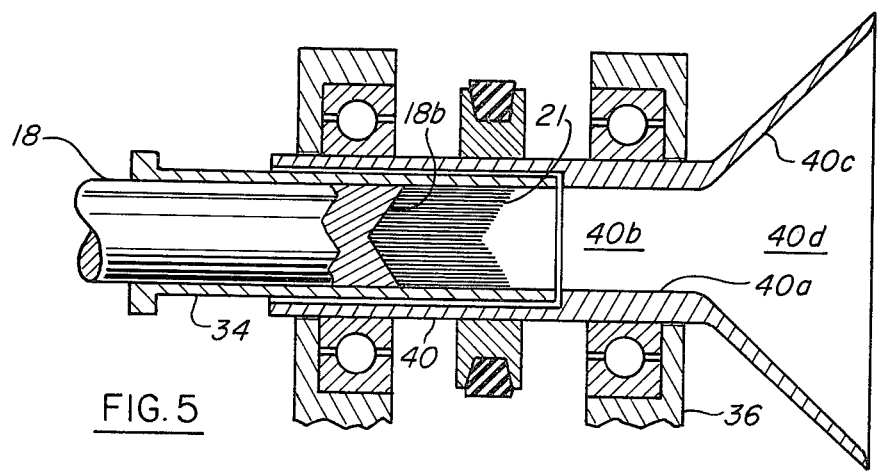
FIGS. 5 – 7 illustrate the sequence of chaff dispensing.
Figure 6:
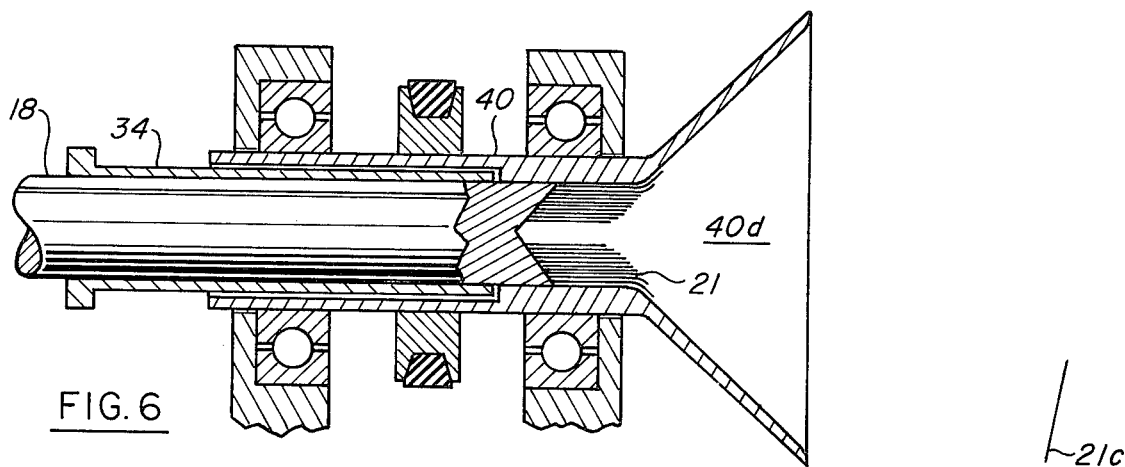
Figure 7:
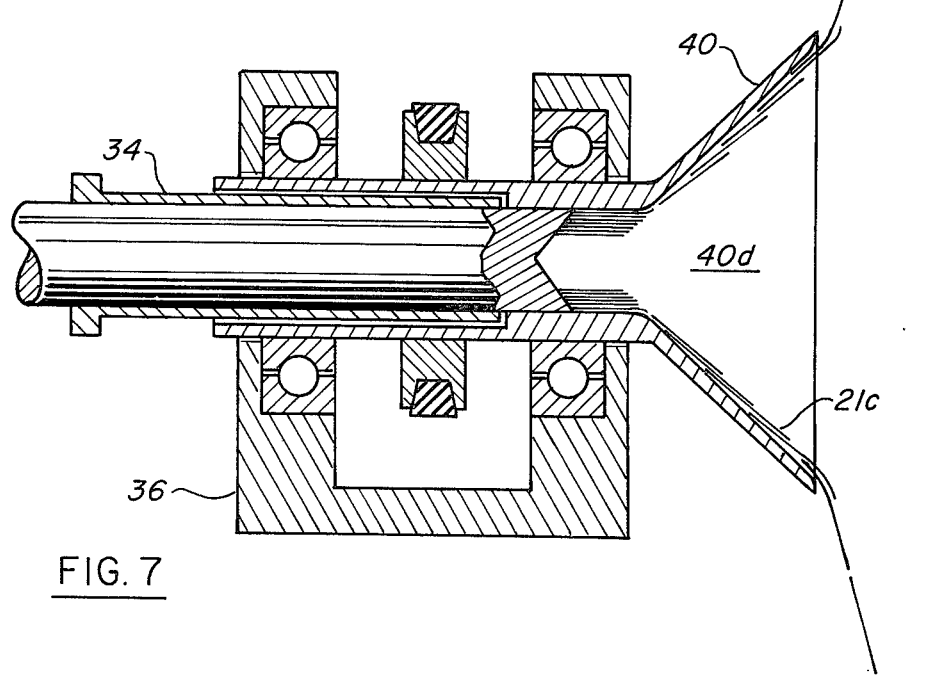

The actual discharge of the chaff fibers is illustrated in FIGS. 5–7. The chaff fibers 21a are shown in two dimensions to facilitate illustration. As shown in FIG. 5, the chaff bundle 21 has a central depression formed therein which corresponds to the configuration of recessed feed plunger head 18b. If more than one chaff bundle 21 is being advanced by the feed plunger 18, each chaff bundle 21 will tend to form a conical depression due to the effects of centrifugal force and this may be enhanced by the use of suitably shaped wads located between the chaff bundles. This tendency can also be enhanced by tapering portion 40a as shown in FIG. 8 at 140a and this will also permit the chaff fibers to be drawn outwardly due to centrifugal force without further pushing by feed plunger 18. The tapering of portion 140a will also be desirable where, as in FIG. 8, the casing 130 effectively forms a planar wad behind the chaff fibers and prevents the formation of a cone-like depression in the chaff bundle 128 independent of centrifugal force. As the chaff bundle 21 is advanced from the FIG. 5 position to the FIG. 6 position it passes from stationary tube 34 to rotatable member 40 where centrifugal force acts upon the chaff bundle 21. Under the influence of centrifugal force, the chaff fibers are forced outwardly and cause the rupturing of casing 21a and the formation of a centrally located void in the chaff bundle 21 due to the outwardly directed centrifugal force. Due to either the chaff fibers mirroring the shape of feed plunger head 18b, as shown in FIGS. 5 – 7 or due to the tapering of portion 140a, as shown in FIG. 8, the chaff fibers form a cone with the outermost chaff fibers located nearest the outlet. Either pushed by feed plunger 18 or under the axial component of the centrifugal force due to the tapering of portion 140a, the chaff fibers move toward the outlet defined by centrifugal acceleration chamber 40d with the outermost fibers being nearest centrifugal acceleration chamber 40d. As the fibers 21c reach the transition between preacceleration chamber 40b and centrifugal chamber 40d they are drawn into the centrifugal chamber 40d and are dispersed at an angle almost orthogonal to the axis of rotatable member 40. The fibers 21c move axially and outwardly replacing the dispersed chaff fibers until the chaff bundle is entirely dispersed. If more than one chaff bundle is being dispersed at a time, each bundle will be sequentially dispersed as described.

Although preferred embodiments of the present invention have been illustrated and described, other changes will occur to those skilled in the art. For example, although a revolver-type of feed system has been described it should be clear that other feed systems such as chaff cartridge belts patterned after those used in machine guns may be used. The flared section of the rotating member may be provided with vanes or other devices to assure full acceleration of the fibers and to control the exit angle and velocity of the fibers. Also, several different combinations of chaff bundles may be used at one time and the indexing motor programmed to stop at the desired chaff bundle combination, or alternative feed sources may be used to provide different chaff bundles. It is therefore intended that the scope of the present invention is to be limited only by the scope of the appended claims.

We claim:
1. A method of dispensing chaff fibers including the steps of:
    feeding chaff fibers to a rotating preacceleration chamber wherein centrifugal force forces the chaff fibers radially outward; and
    causing the chaff fibers to pass from the rotating preacceleration chamber to a rotating centrifugal acceleration chamber having a diverging outlet whereby chaff fibers entering the centrifugal accel- eration chamber are forced outwardly due to centrifugal force and are dispensed at an angle almost orthogonal to the rotational axis of the centrifugal acceleration chamber.

2. The method of claim 1 when the step of feeding chaff fibers includes feeding a desired number of bundles of chaff fibers of desired length.

3. The method of claim 1 wherein the step of feeding chaff fibers includes feeding chaff fibers in a predetermined distribution of lengths whereby radar interference can be produced in a plurality of radar bands.

4. A centrifugal chaff dispenser comprising:
means defining a preacceleration chamber and a coaxial centrifugal acceleration chamber having a diverging outlet;
means for causing said means defining a preacceleration chamber and a centrifugal acceleration chamber to rotate and to thereby produce a centrifugal force in said chambers;
chaff fibers; and
feed means for feeding said chaff fibers to said preacceleration chamber wherein said chaff fibers are subjected to centrifugal force and are forced radially outward and for then feeding said chaff fibers to said centrifugal acceleration chamber whereby said chaff fibers entering said centrifugal acceleration chamber are forced outwardly due to centrifugal force and are dispensed at an angle almost orthogonal to the rotational axis of said centrifugal acceleration chamber.

5. The centrifugal chaff dispenser of claim 4 wherein said feed means are adjustable to permit the dispensing of said chaff fibers in varying amounts.

6. The centrifugal chaff dispenser of claim 4 wherein said chaff fibers are fed in bundles containing said chaff fibers in a predetermined distribution of lengths.

7. A centrifugal chaff dispenser comprising;
means defining a tapered preacceleration chamber and a coaxial centrifugal acceleration chamber having a diverging outlet;
means for causing said means defining a preacceleration chamber and a centrifugal acceleration chamber to rotate and to thereby produce a centrifugal force in said chambers;
chaff fibers; and
feed means for feeding said chaff fibers to said preacceleration chamber wherein said chaff fibers are subjected to centrifugal force and, due to the tapering of said preacceleration chamber, are forced radially and axially outward whereby said chaff fibers are caused to enter said centrifugal acceleration chamber and are forced outwardly due to centrifugal force and are dispensed at an angle almost orthogonal to the rotational axis of said centrifugal acceleration chamber.

8. The centrifugal chaff dispenser of claim 7 wherein said feed means include means for the sequential feeding of a predetermined number of bundles of said chaff fibers.

9. The centrifugal chaff dispenser of claim 8 wherein said bundles contain said chaff fibers in a predetermined distribution of lengths.

* * * * *